(12) United States Patent
Ferguson

(10) Patent No.: US 11,932,171 B2
(45) Date of Patent: Mar. 19, 2024

(54) STRUTS FOR VEHICLE MOUNTED HOIST

(71) Applicant: Greg Ferguson, Phoenix, AZ (US)

(72) Inventor: Greg Ferguson, Phoenix, AZ (US)

(*) Notice: Subject to any disclaimer, the term of this patent is extended or adjusted under 35 U.S.C. 154(b) by 498 days.

(21) Appl. No.: 17/331,850

(22) Filed: May 27, 2021

(65) Prior Publication Data

US 2021/0284077 A1 Sep. 16, 2021

Related U.S. Application Data

(63) Continuation-in-part of application No. 17/109,240, filed on Dec. 2, 2020, now Pat. No. 11,292,701, which is a continuation-in-part of application No. 15/934,970, filed on Mar. 24, 2018, now abandoned.

(51) Int. Cl.
*B60R 11/00* (2006.01)

(52) U.S. Cl.
CPC ......... *B60R 11/00* (2013.01); *B60R 2011/004* (2013.01)

(58) Field of Classification Search
CPC .......................... B60R 11/00; B60R 2011/004
See application file for complete search history.

(56) References Cited

U.S. PATENT DOCUMENTS

| | | | | | |
|---|---|---|---|---|---|
| 2,492,364 A | * | 12/1949 | Levy | ..................... | B60P 1/4407 414/438 |
| 2,559,451 A | * | 7/1951 | McBrearty | .............. | B64C 25/14 188/289 |
| 3,591,024 A | * | 7/1971 | Runge | ..................... | E02F 7/026 414/739 |
| 3,700,202 A | * | 10/1972 | Donnels | ................... | E04G 21/16 248/354.3 |
| 3,941,405 A | * | 3/1976 | Vetter | .................... | B62K 27/00 280/203 |
| 4,721,325 A | * | 1/1988 | Mackovjak | .......... | B60G 15/068 280/124.147 |
| 4,877,222 A | * | 10/1989 | Davis | ..................... | F16F 9/368 188/274 |
| 4,982,974 A | * | 1/1991 | Guidry | ..................... | B60R 3/02 280/166 |
| 5,901,980 A | * | 5/1999 | Few | ......................... | B60S 9/06 254/424 |
| 5,967,536 A | * | 10/1999 | Spivey | .................. | B60G 17/021 280/124.141 |
| 6,152,674 A | * | 11/2000 | Ogrodnick | ............... | B60P 3/06 414/491 |
| 2004/0262949 A1 | * | 12/2004 | Rasmussen | ............ | F16M 13/02 296/61 |
| 2006/0049562 A1 | * | 3/2006 | Venton-Walters | ... | B60G 13/003 267/293 |
| 2011/0208187 A1 | * | 8/2011 | Wong | .................. | A61B 17/6416 606/56 |
| 2013/0105658 A1 | * | 5/2013 | Hisel | ........................ | B66F 3/25 248/352 |
| 2013/0186222 A1 | * | 7/2013 | Gomez | .................. | B28D 1/068 74/342 |

(Continued)

*Primary Examiner* — Brian D Nash

(57) ABSTRACT

The invention is a strut assembly for attaching to vehicle frames as a set to provide a secure and stable anchor or effective platform for a vehicle mounted hoist or other load bearing or load resisting accessory. A particular embodiment is directed to fitting into rectangular apertures found in pickup truck bed side panels, and these strut assemblies are attached to the frame of the vehicle.

18 Claims, 2 Drawing Sheets

(56) References Cited

U.S. PATENT DOCUMENTS

| | | | |
|---|---|---|---|
| 2016/0059794 A1* | 3/2016 | Brown | B60R 11/0235 |
| | | | 224/404 |
| 2018/0347657 A1* | 12/2018 | Hinz | F16F 9/062 |
| 2019/0291624 A1* | 9/2019 | Ferguson | B60P 1/483 |
| 2020/0240125 A1* | 7/2020 | Harrison | E03C 1/0404 |
| 2021/0078839 A1* | 3/2021 | Ferguson | B60P 1/28 |
| 2023/0054557 A1* | 2/2023 | Ruff | B60R 11/00 |

* cited by examiner

STRUTS FOR VEHICLE MOUNTED HOIST

CROSS REFERENCE TO RELATED APPLICATION

This non-provisional utility patent application is a continuation in part of non-provisional patent application Ser. No. 17/109,240 "Vehicle Mounted Hoist," filed 2 Dec. 2020 and currently pending. Non-provisional utility patent application Ser. No. 17/109,240 "Vehicle Mounted Hoist," filed 2 Dec. 2020, is a continuation in part of non-provisional utility patent application Ser. No. 15/934,970 "Hydraulic Truck Bed Lifting Apparatus and Method" filed 24 Mar. 2018 and now abandoned.

The entire contents of non-provisional utility patent application Ser. No. 17/109,240 "Vehicle Mounted Hoist," filed 2 Dec. 2020 and the entire contents of non-provisional utility patent application Ser. No. 15/934,970 "Hydraulic Truck Bed Lifting Apparatus and Method" filed 24 Mar. 2018 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to apparatus for reinforcing a pickup truck bed or a flatbed truck frame to support a lifting apparatus capable of moving heavy loads.

BACKGROUND

Users of pickup trucks and flatbed trucks may wish to attach hoists or other lifting apparatus for loading and unloading large, heavy, or unwieldy objects as cargo. Some of these sorts of vehicles require reinforced attachment points to support reaction forces absorbed from the hoist.

BRIEF DESCRIPTION

A primary objective of the invention is to provide a secure structural foundation for supporting various embodiments of hoisting devices which may be installed onto a variety of makes and models of pickup trucks and flatbed trucks.

Another objective of the invention is to afford safely and reliably support the hoisting machinery while in uses, including supplying excess margins of material robustness so that the hoist performs safely.

Yet another objective of the invention to channel the lifting and moving forces acquired by a vehicle mounted hoist or other load bearing or load resisting accessory, and transfer these forces directly to the vehicle frame or the ground so that distortion of the vehicle bed or body panels is minimized or eliminated.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The invention is a strut assembly for attaching to vehicle frames as a set to provide a secure and stable anchor or effective platform for a vehicle mounted hoist or other load bearing or load resisting accessory. A particular embodiment is directed to fitting into rectangular apertures found in pickup truck bed side panels, and these strut assemblies are attached to the frame of the vehicle.

Figure 1A:
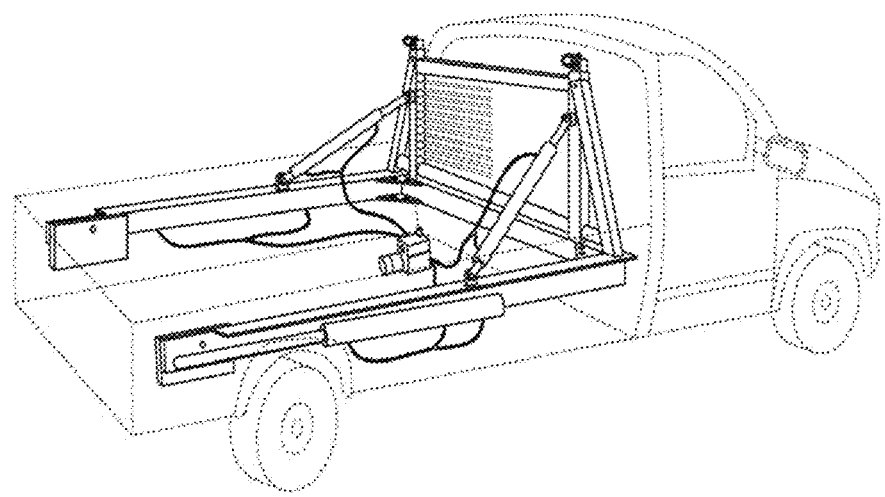
FIG. 1A shows a perspective view of an embodiment of a lifting device mounted to a vehicle.

FIG. 1A shows a perspective view of an embodiment of a lifting device mounted to a vehicle. This lifting device comprises a first and a second set of pivotable frames, and the second pivotable frame also included an extendable frame. A complete description of this particular lifting device is found in the parent application. The lifting device is secured to panel components of the pickup bed.

Figure 1B:
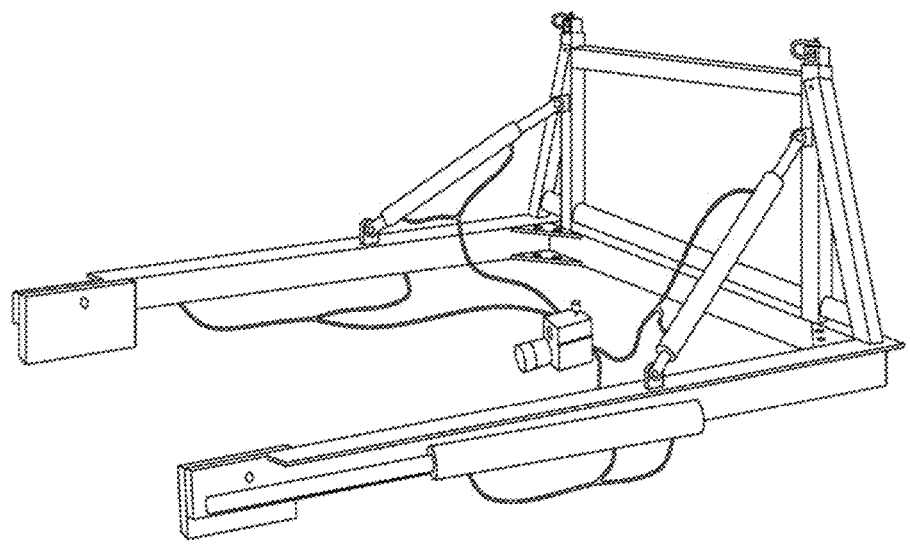
FIG. 1B shows a perspective view of an embodiment of a lifting device but without the pickup truck, for clarity of showing an example of the types of devices that the invention is designed to support.

FIG. 1B shows a perspective view of an embodiment of a lifting device but without the pickup truck, for clarity of showing an example of the types of devices that the invention is designed to support. The hoist assembly comprises first and second fixed rails of with reinforcing plate which are components of these fixed rails. A first frame comprises a first lintel spanning between first and second legs attached to the lintel and rotatably coupled to the fixed rails. A second frame comprises a second lintel spanning first and second extendable beams, with the extendable beams each being rotatably coupled to the first lintel. The hoist is raised and lowered by forces generated one or more extendable members with its first end coupled to the legs. The second frame is pivotable with respect to the first by means of one or more other force generating extendable members coupled between the first leg and the frame. The force generating extendable members are preferably hydraulic cylinders powered by a hydraulic pump but according to other embodiments may also be pneumatic pistons or jack screws.

Figure 2:
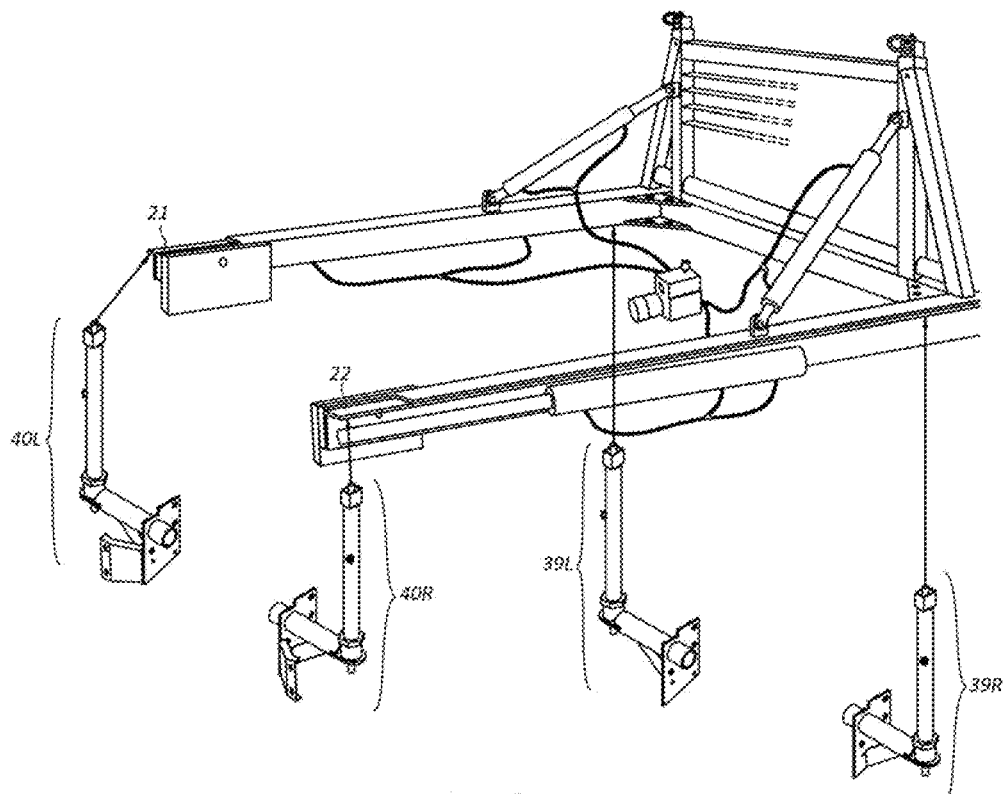
FIG. 2 shows an embodiment of a hoist assembly including mounting strut assemblies in accordance with the invention, as configured for installation in a pickup truck bed having siderails which include stake holes typically used for fence side panels.

FIG. 2 shows an embodiment of a hoist assembly including mounting strut assemblies in accordance with the invention, as configured for installation in a pickup truck bed having siderails which include stake holes typically used for fence side panels. Four strut assemblies in accordance with the invention secure the fixed rails [21] and [22] to the side panels of the pickup truck bed. The strut assemblies are installed in the set of rectangular stake apertures in pickup truck bed body panels which are also commonly used for securing other vehicle accessories besides a hoist assembly, including but not limited to camper shells, ladder racks, tool boxes, bed covers, bed rail caps, tie-downs, cargo bars, cargo bed extenders, stake sides for livestock transport, side bed boxes, liquid tanks, roll bars, and bed liners. The strut assembly embodiments shown includer a left front strut assembly [39L,] a left rear strut assembly [40L,] a right front strut assembly [39R,] and a right rear strut assembly [40R.]

Figure 3A:
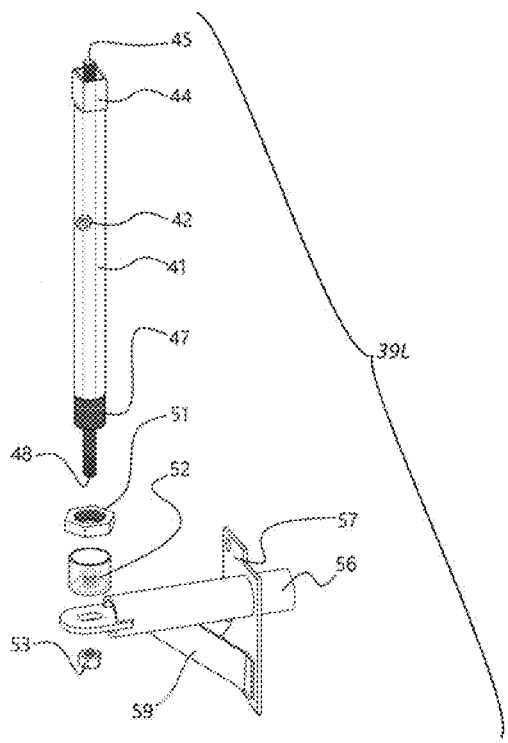
FIG. 3A shows an exploded view of components of an embodiment of a left front strut assembly with its support bracket components.

FIG. 3A shows an exploded view of components of an embodiment of a left front strut assembly with its support bracket components. Strut assemblies are designed to fit within and align with rectangular cutouts in pickup truck side body panels which are usually used for receiving the wooden vertical stakes of livestock panels for pickup truck beds. The strut assemblies provide secure attachment points with minimal modification required to the pickup truck body panels and minimal marring of the cosmetic aspects of these body parts. A right front strut assembly is symmetrically opposite to a left front strut assembly.

The vehicle-mounted strut assembly comprises a vertical strut [41] which is a tube having first and second threaded ends with a first stepped threaded end and a second end having a rectangular head, with the tube extending along an axis to define a length between the first and second ends, and includes a transverse nut [42] affixed at an intermediate point along its length.

Figure 3B:
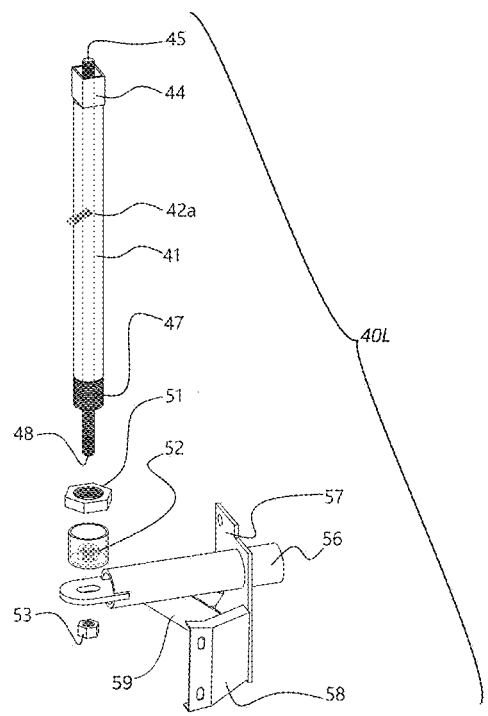
FIG. 3B shows an exploded view of components of an alternative embodiment of a left rear strut assembly with its support bracket components.

A transverse nut is a component having female threads defining an axis substantially perpendicular to the axis of the strut. In this specification, "substantially perpendicular" refers to an orientation between a first and a second geometric feature or entity wherein the second entity resides within 15° of perpendicular to the first entity. According to an alternative embodiment in which the thread definitions are reversed, the transverse nut may be substituted by a transverse stud having male threads, such as stud [42a] as shown in FIG. 3B. The first end comprises a first threaded portion having threads of a first pitch diameter and a second threaded portion having threads of a second pitch diameter. The other end, or second end, includes a threaded stud which resides within a rectangular tube. In this embodiment the first threaded portion and the second threaded portion both reside on a stud having stepped diameters of a first and a second diameter.

The rectangular tube forms a head which fits the rectangular stake apertures in the body panels of a typical pickup truck bed, and constrains the strut from rotation when installed from below with the restraining nut [51.] The restraining nut is a second nut threadingly engaged with the first threaded portion [47] of the first, larger pitch diameter on the first end of the strut. A second threaded portion [48] of the first end of the strut has threads of a second pitch diameter and projects beyond the first threaded portion. The second end of the mounting strut includes a third threaded portion [45] to which the support rails of the hoist assembly attach. The third threaded portion is preferably a threaded stud residing within a rectangular tube section.

Hoist forces which pass through the strut are routed to the vehicle frame through a transverse strut [56] which attaches to the vehicle frame through a frame bracket [57] which affixes to a distal end of the transverse strut, such as by welding. The transverse strut extends along a second axis substantially perpendicular to said first axis defined by the strut tube. The frame bracket is sized and oriented on the transverse stud so as to be complementary to a mounting face or attachment site selected on the vehicle frame. With the strut assembly tube defining a first axis, the transverse frame brackets for the right front strut assembly are formed and arranged symmetrically opposite to the left front components shown in this figure. Additional support members may be included between the transverse strut and the frame brackets as required for the loading conditions anticipated for the hoist. The transverse strut is secured to the first threaded end of the vertical strut by a bottom nut [53] which secures the transverse strut against a strut spacer [52] interposed between the restraining nut and the transverse strut. The spacer may also abut against the restraining nut. The transverse strut supports vertical forces acquired from the lifting device as a cantilevered beam supported near its distal end by an angled support [59] also attached to the transverse strut and spanning between the strut tube and the frame bracket.

FIG. 3B shows an exploded view of components of an alternative embodiment of a left rear strut assembly with its support bracket components. It comprises many of the same components of the left front strut, but with an auxiliary bracket [58] included for attachment to a transverse member of the vehicle frame while frame bracket [57] attaches to the longitudinal frame rail. The auxiliary bracket may attach to the frame bracket or to a second transverse strut also attached to the vertical tube. All components in this figure having the same index numbers as defined and explained in FIG. 3A refer to identical or equivalent components. Frame brackets for the right rear strut assembly are formed and arranged symmetrically opposite to the left rear components shown in this figure. Also in this figure, the transverse nut ([42] seen in FIG. 3A) located at an intermediate point along the length of the strut has been substituted by a transverse stud [42a] having male threads.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A vehicle-mounted strut assembly, comprising:
   a tube having first and second ends,
   with said first end comprising a first threaded portion having threads of a first pitch diameter and a second threaded portion having threads of a second pitch diameter,
   with said second end comprising a threaded stud residing within a rectangular tube, and
   wherein said first threaded portion and said second threaded portion both reside on a stud having stepped diameters of a first and a second diameter.

2. The vehicle-mounted strut assembly of claim 1, wherein said tube extends along a first axis to define a length between said first and second ends, and further comprising a transverse nut affixed at an intermediate point along said length.

3. The vehicle-mounted strut assembly of claim 1, wherein said tube extends along an axis to define a length between said first and second ends, and further comprising a transverse stud affixed at an intermediate point along said length, with said transverse stud comprising male threads.

4. The vehicle-mounted strut assembly of claim 1, further comprising a second nut threadingly engaged with said first threaded portion of said first end of said tube.

5. The vehicle-mounted strut assembly of claim 1, further comprising a transverse strut extending along a second axis substantially perpendicular to said first axis.

6. The vehicle-mounted strut assembly of claim 5, further comprising a frame bracket affixed to an end of said transverse strut.

7. The vehicle-mounted strut assembly of claim 6, further comprising an angled support spanning between said transverse strut and said frame bracket.

8. The vehicle-mounted strut assembly of claim 6, further comprising an auxiliary bracket attached to said frame bracket.

9. The vehicle-mounted strut assembly of claim 5, further comprising a second nut threadingly engaged with said first threaded portion of said first end of said tube, and a spacer interposed between said second nut and said transverse strut.

10. A vehicle-mounted strut assembly, comprising:
    a tube having first and second ends,
    with said first end comprising a first threaded portion having threads of a first pitch diameter and a second threaded portion having threads of a second pitch diameter,
    with said second end comprising a threaded stud residing within a rectangular tube, and
    further comprising an angled support spanning between said transverse strut and said frame bracket.

11. The vehicle-mounted strut assembly of claim 10, wherein said first threaded portion and said second threaded portion both reside on a stud having stepped diameters of a first and a second diameter.

12. The vehicle-mounted strut assembly of claim 10, wherein said tube extends along a first axis to define a length between said first and second ends, and further comprising a transverse nut affixed at an intermediate point along said length.

13. The vehicle-mounted strut assembly of claim 10, wherein said tube extends along an axis to define a length between said first and second ends, and further comprising a transverse stud affixed at an intermediate point along said length, with said transverse stud comprising male threads.

14. The vehicle-mounted strut assembly of claim 10, further comprising a second nut threadingly engaged with said first threaded portion of said first end of said tube.

15. The vehicle-mounted strut assembly of claim 10, further comprising a transverse strut extending along a second axis substantially perpendicular to said first axis.

16. The vehicle-mounted strut assembly of claim 15, further comprising a frame bracket affixed to an end of said transverse strut.

17. The vehicle-mounted strut assembly of claim 16, further comprising an auxiliary bracket attached to said frame bracket.

18. The vehicle-mounted strut assembly of claim 15, further comprising a second nut threadingly engaged with said first threaded portion of said first end of said tube, and a spacer interposed between said second nut and said transverse strut.

* * * * *